United States Patent [19]

Kuwajima et al.

[11] Patent Number: 4,624,973

[45] Date of Patent: * Nov. 25, 1986

[54] AQUEOUS COATING COMPOSITION

[75] Inventors: Teruaki Kuwajima, Higashiosaka; Keizou Ishii, Ashiya; Hiroshi Miwa, Itami; Shinichi Ishikura, Kyoto, all of Japan

[73] Assignee: Nippon Paint Co., Ltd., Osaka, Japan

[*] Notice: The portion of the term of this patent subsequent to May 21, 2002 has been disclaimed.

[21] Appl. No.: 634,865

[22] Filed: Jul. 26, 1984

[30] Foreign Application Priority Data

Jul. 26, 1983 [JP] Japan ............................ 58-137290

[51] Int. Cl.⁴ .......................................... C08L 33/02
[52] U.S. Cl. .................................. 523/221; 524/460; 524/501; 524/504; 524/513; 524/522; 524/523
[58] Field of Search ............... 523/221; 524/460, 501, 524/504, 513, 522, 523

[56] References Cited

U.S. PATENT DOCUMENTS

| | | | |
|---|---|---|---|
| 3,876,578 | 4/1975 | Takada et al. | 524/501 |
| 3,969,560 | 7/1976 | Lewis et al. | 524/460 |
| 4,069,186 | 1/1978 | Ramig | 524/522 |
| 4,116,903 | 9/1978 | Lietz et al. | 524/513 |
| 4,254,004 | 3/1981 | Abbey | 523/221 |
| 4,294,735 | 10/1981 | Bentley et al. | 524/504 |
| 4,383,055 | 5/1983 | Johannes et al. | 523/221 |
| 4,384,056 | 5/1983 | Schmidt et al. | 524/522 |
| 4,395,500 | 7/1983 | Löhr et al. | 523/221 |
| 4,419,465 | 12/1983 | Backhouse et al. | 524/523 |
| 4,426,482 | 1/1984 | Kuramoto et al. | 524/460 |
| 4,427,819 | 1/1984 | Wessling et al. | 524/460 |
| 4,442,247 | 4/1984 | Ishikura et al. | 524/523 |
| 4,460,732 | 7/1984 | Buscall et al. | 524/460 |
| 4,474,860 | 10/1984 | Van Gilder et al. | 523/221 |

*Primary Examiner*—Paul R. Michl
*Assistant Examiner*—Alex H. Walker
*Attorney, Agent, or Firm*—Wenderoth, Lind & Ponack

[57] ABSTRACT

An aqueous coating composition which comprises at least one aqueous resin selected from polyester, alkyd, acrylic, acryl modified—polyester and acryl modified—alkyd resins, and at least one water—insoluble resinous particles obtained by the polymerization or copolymerization of $\alpha$, $\beta$—ethylenically unsaturated monomers, which is characterized by that said resinous particles are composed of mixture of (A) group of particles having a mean grain diameter of $0.3 \sim 6\mu$ and (B) group of particles having a mean grain diameter of $0.01 \sim 0.1\mu$, in weight ratio of (A)/(B)=99.9/0.1~40/60 and that the solid weight ratio of said aqueous resin to water insoluble resinous particles is 99/1~15/85. The coating composition is well balanced in application characteristics and in film performance as gloss and surface smoothness and hence is quite useful as a top coat.

8 Claims, No Drawings

AQUEOUS COATING COMPOSITION

FIELD OF INVENTION

The present invention relates to an aqueous coating composition and more specifically, an aqueous coating composition, being useful as a top coat, having well-balanced properties required for a top coat as gloss, surface smoothness and application characteristics, as well as storage stability, durability or the like and comprising as resinous vehicle a combination of water insoluble resinous particles prepared by the polymerization of ethylenically unsaturated monomer(s), and an aqueous resin.

BACKGROUND OF THE INVENTION

Recently, attention has been directed to the use of combination of aqueous resin and water insoluble resinous particles as resinous vehicle in an aqueous coating composition, because of the specific rheological properties thereof. Usually, with said combination, it is possible to increase the resinous content of the composition without undesirably increasing the viscosity. Moreover, such compositions have been developed principally as a base coat or inter coat and are not possessed of the desired properties for a top coat like gloss and surface smoothness.

Under the circumstances, has long been desired an aqueous coating composition which maintains the desired properties of aqueous resin as excellent pigment dispersibility and the like, has excellent application characteristics and storage stability and furthermore the desired film performance for a top-coat as gloss and surface smoothness.

In a series of studies for the improvement of application characteristics of an aqueous coating composition comprising water insoluble resinous particles and aqueous resin, the inventors have concentrated efforts in finding out the correlation between the film properties and combination of resins, natures of resinous particles, compounding ratio of said aqueous resin and water insoluble resinous particles, solid content of the composition and the like, and found that particularly excellent composition in regard to pigment dispersion stability, application characteristic, storage stability, as well as the desired properties as top coat, i.e. gloss and surface smoothness of the coating, can be obtained by the combination of particular aqueous resin and particular water insoluble resinous particles. On the basis of said finding, the present invention has been made.

SUMMARY OF THE INVENTION

According to the present invention, is provided an aqueous coating composition comprising at least one aqueous resin selected from the group cnsisting of polyester, alkyd, acrylic, acryl-modified polyester and acryl-modified alkyd resins, and at least one water insoluble resinous particles obtained by the polymerization of copolymerization of $\alpha, \beta$-ethylenically unsaturated monomer(s), as resinous vehicle, characterized by that said resinous particles are a mixture of particles (A) with a mean grain diameter of 0.3 to 6$\mu$ and particles (B) with a mean grain diameter of 0.01 to 0.1$\mu$ in a weight ratio of (A)/(B)=99.9/0.1 to 40/60, and that the solid weight ratio of said aqueous resin to water insoluble resinous particles is 99/1 to 15/85.

PREFERRED EMBODIMENTS OF THE INVENTION

The aqueous resin (water soluble or water dilutable resin, hereinafter the same) used in the present invention is a member selected from the group consisting of polyester resin, alkyd resin, acrylic resin, acryl-modified polyester resin and acryl-modified alkyd resin customarily used in paint area.

That is, the polyester resin is the product obtained by the polycondensation of polybasic acid with polyhydric alcohol, and alkyd resin is the polyester subjected to an esterification modification with drying oil, fatty acid and the like. Acrylic resin is the product obtained by the polymerization of monomer having in its molecule at least one polymerizable ethylenically unsaturated bonding.

The acryl-modified polyester resin and acryl-modified alkyd resin, i.e. polyester and alkyd resins each having acryl polymer segments in the molecule, may also be advantageously employed in the present invention.

The abovesaid resins are usually possessed of acidic groups as carboxyl and therefore, can be easily converted to water-soluble or dilutable resins by the neutralization with basic materials.

Both techniques for preparing such resins and for converting them to water soluble or dilutable type resins are well known in the art and hence no specific explanations would be required in these respects. From the abovesaid members, one or more than two of the aqueous resins are selected and used, and they may be of thermoplastic or thermosetting type. That is, they may or may not carry functional groups capable of reacting with those of other aqueous resin and/or resinous particles. Examples of such functional groups are carboxyl, sulfonic, phosphoric, hydroxyl, oxirane, active methylol, amino, reactive carbon-carbon unsaturation bonding and the like.

These groups may be easily incorporated into the resins by a generic procedure as, for example, selection of monomer to be polymerized, control of polymerization reaction and the like.

In the present invention, beside the abovesaid aqueous resin, are used water-insoluble resinous particles composed of acrylic or vinyl polymer or copolymer of ethylenically unsaturated compound(s).

As the ethylenically unsaturated compounds, any of the members having in their molecules at least one ethylenically unsaturated bonding may be satisfactorily used, including the following:

(1) carboxyl group copntaining monomers: as, for example, acrylic acid, methacrylic acid, crotonic acid, itaconic acid, maleic acid, fumaric acid and the like.
(2) hydroxyl containing monomer: as, for example, 2-hydroxyethyl acrylate, hydroxypropyl acrylate, 2-hydroxyethyl methacrylate, hydroxypropyl methacrylate, hydroxybutyl acrylate, hydroxybutyl methacrylate, allyl alcohol, methacllyl alcohol and the like.
(3) nitrogen-containing alkyl acrylates or methacrylates: as, for example, dimethylaminoethyl acrylate, dimethylamino ethyl methacrylate and the like.
(4) polymerizable amides: as, for example, acrylamide, methacrylamide and the like.
(5) polymerizable nitriles: as, for example, acrylonitrile, methacrylonitrile and the like.

(6) alkyl acrylates or methacrylates: as, for example, methyl acrylate, methyl methacrylate, ethyl acrylate, ethyl methacrylate, n-butyl acrylate, n-butyl methacrylate, and the like.

(7) polymerizable aromatic compounds: as, for example, styrene, α-methyl styrene, vinyl toluene, t-butyl styrene and the like.

(8) α-olefins: as, for example, ethylene, propylene and the like.

(9) vinyl compounds: as, for example, vinyl acetate, vinyl propionate and the like.

(10) diene compounds: as, for example, butadiene, isoprene and the like.

These monomers may be used singularly or in combination form. The said polymer may be as desired composed of crosslinked polymer. In that case, mutually reactive groups may be possessed by said ethylenically unsaturated monomers, as for example, epoxy and carboxyl; amine and carboxyl; epoxy and acid anhydride; amine and acid chloride; alkyleneimine and carbonyl; organoalkoxysilane and carboxyl; hydroxyl and isocyanate or the like, or an additional monomer having two and more of ethylenically unsaturated groups capable of entering in radical polymerization (hereinafter called as crosslinking monomer) may be copolymerized with said monomers. As the crosslinking monomers, mention is made of polymerizable unsaturated monocarboxylic acid ester of polyhydric alcohol; polymerizable unsaturated alcohol ester of polybasic acid; and aromatic compound substituted with two and more of vinyl groups. Examples of crosslinking monomers are ethyleneglycol acrylate, ethyleneglycol methacrylate, triethyleneglycol dimethacrylate, tetraethyleneglycol dimethacrylate, 1,3-butyleneglycol dimethacrylate, trimethylol propane triacrylate, trimethylolpropane trimethyacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol alloxydimethacrylate, 1,1,1-trishydroxymethylethane diacrylate, 1,1,1-trishydroxymethyl ethane triacrylate, 1,1,1-trishydroxymethylethane dimethacrylate, 1,1,1-trishydroxymethylethane trimethacrylate, 1,1,1-trishydroxymethylpropane diacrylate, 1,1,1-trishydroxymethylpropane triacrylate, 1,1,1-trishydroxymethylpropane dimethacrylate, 1,1,1-trishydroxymethylpropane trimethacrylate, triallyl cyanurate, triallyl isocyanurate, triallyl trimellitate, diaryl terephthalate, diaryl phthalate, divinyl benzene and the like.

In the present invention, the most important characteristic feature resides in the point that such acrylic or vinyl polymer or copolymer particles are composed of the mixture of relatively larger size particles (A) having a mean grain diameter of 0.3 to 6μ, preferably 0.4 to 5μ, and relatively smaller size particles (B) having a mean grain diameter of 0.01 to 0.1μ. By the adoption of this feature, i.e. combination of two types of resinous particles each having different grain size distribution, it is possible to attain the objects of having well-balanced improvements in application characteristics of the composition based on the relatively larger grains and in gloss and surface smoothness of the coating based on the relatively smaller grains, and allowing to use a variety of aqueous resins, a wider range of particle size and monomer composition for the insoluble resinous particles and a number of emulsifier and the like. The acrylic or vinyl polymer particles with a mean grain diameter of 0.3 to 6μ used in the invention may be obtained by any of the known methods. For example, they may be prepared by a solution or suspension polymerization of selected monomer(s) and subjecting thus obtained product to a mechanical pulverization to the defied grain size. However, preference is given to an emulsion polymerization of the selected monomer(s) in an aqueous medium containing surfactant or emulsifier, in the presence of polymerization initiator or the like, and especially, an emulsion polymerization using the so-called seed emulsion or water soluble oligomer of the same monomer(s).

For the preparation of acrylic or vinyl polymer particles with a mean grain diameter of 0.01 to 0.1μ, it is preferred to use the so-called emulsion polymerization technique. That is, the selected monomer(s) is (are) polymerized in an aqueous medium containing surfactant or emulsifier, in the presence of polymerization initiator. Most preferably, is used the so-called seed emulsion or a water soluble oligomer as stated hereinbefore. Since the emulsion polymerization technique per se is of common knowledge, no detailed explanation would be required.

In carrying out an emulsion polymerization, any of the commonly used surfactants or emulsifiers may be satisfactorily used and however, in view of the fact that the desired particle size is of quite low order, a comparatively larger quantity of such emulsifier should preferably be used. It is highly recommendd to use, together with or in place of such emulsifier, an amphoteric compound or resin as stated in Japanese Patent Application Nos. 97190/80; 97191/80; 116292/80; 116293/80; 24461/81; 71863/80 and 71864/81 and the like.

As the polymerization initiator, use can be made of organic peroxides as benzoyl peroxide, t-butyl peroxide, cumene hydroperoxide and the like; organic azo compounds as azobiscyanovaleric acid, azobisisobutyronitrile, azobis(2,4-dimethyl)valeronitrile, azobis(2-amidinopropane)hydrochloride and the like; inorganic water soluble radical initiators as potassium persulfate, ammonium persulfate, hydrogen peroxide and the like; and redox type initiators and the like. Examples of chain transfer agents used are mercaptans as ethyl mercaptan, butyl mercaptan and dodecyl mercaptan, and halogenated carbons as carbon tetrabromide, carbon tetrachloride and the like.

As to the weight ratio of these surfactant, emulsifier, polymerization initiator, chain transfer agent and water and to the polymerization procedures, they all follow in the wake of conventional technique.

In a usual emulsion polymerization, an aqueous medium is used to obtain an emulsion having uniformly dispersed therein water insoluble resinous particles. In the present invention, thus obtained emulsion may be directly used and combined with aqueous resin. Alternatively, the emulsion may be concentrated and then combined with aqueous resin or fine particles may be separated from the emulsion and used. Therefore, the reaction medium can never be limitted to water alone and the so-called NAD method using a non-aqueous solvent may be satisfactorily used as well, for the preparation of the present water insoluble resinous particles.

The abovesaid resinous particles (A) and resinous particles (B) are mixed together in a weight ratio of 99.9/0.1 to 40/60, preferably 99/1 to 50/50, and actual mixing ratio may be freely changed depending on the aqueous resin used, desired objects and effects and the like.

It is recognized in general that an increase in (A) will be contributive to the improvement in application characteristic and in (B) to the improvement in gloss and surface smoothness of the coating.

The present acrylic or vinyl polymer particles with a mean grain diameter of 0.3 to 6μ may be as desired composed of the following specific double structure, thereby attaining further benefits of increase in film performance as a top coat.

(1) Polymer particles each having double structure comprising hard shell of the polymer with relatively higher glass transition point (Tg) and soft core of the polymer with relatively lower Tg value:

In preparing a polymer or copolymer of ethylenically unsaturated compound(s), the following have been well known in the art that Tg of homopolymer may vary with the kind of monomer used, that in the case of copolymer, the Tg will take an intermediary level between the values of those of homopolymers from the respective constituting monomers, and hence the Tg of such copolymer may be freely designed by the selection of appropriate constituting monomers, and that Tg value of polymer or copolymer may be lowered by making a blend with plasticizer, solvent or the like.

Preparation of polymer from ethylenically unsaturated compounds and of microparticles of said polymer have also been well known, and therefore, the abovesaid double-structured polymer particles may be easily prepared by, for example, emulsion polymerization technique. That is, the core-forming monomer(s) is(are) first polymerized according to normal emulsion polymerization technique, in an aqueous medium containing surfactant or emulsifier and in the presence of polymerization initiator. As the emulsifier, any of the members customarily used in a conventional emulsion polymerization may be advantageously used. In place of or in addition to the said emulsifier, use can be made of amphoteric compounds as stated in, for example, Japanese Patent Application Nos. 110865/79; 56048/80; 116293/80; 12389/78; 47652/80; 71864/81; 13053/82 and the like.

Polymerization initiator is also of conventional type, and examples are organic peroxides as benzoyl peroxide, t-butyl peroxide, cumene hydroperoxide and the like; organic azo compounds as azobiscyanovaleric acid, azobisisobutyronitrile, azobis-(2,4-dimethyl)-valeronitrile, azobis(2-amidinopropane)hydrochloride and the like, inorganic water soluble radical initiators as potassium persulfate, ammonium persulfate, sodium persulfate, hydrogen peroxide and the like, and redox type initiator.

The grain diameters are preferably controlled so as to be less than 0.3 to 6μ. Next, other monomer(s) capable of resulting a polymer having a higher glass transition point than that of the core polymer are, together with an additional amount of initiator as desired, added and polymerized by an emulsion polymerization using the aforesaid core polymer particles as seed materials, to obtain the desired double structured polymer particles with a mean grain diam. of 0.3 to 6μ. However, the present invention can never be limited by the method for the preparation of double structured polymer particles and any of the appropriate means including NAD method may be satisfactorily used.

Employment of such double structured polymer particles comprising hard shell of relatively higher Tg polymer and soft core of relatively lower Tg polymer will afford the benefits of widening the selection range of the aqueous resins and tolerable grain size distribution.

(2) Polymer particles each having double structure comprising soft shell of the polymer with relatively lower Tg value and hard core of the polymer with relatively higher Tg value: Such polymer particles may be easily prepared according to the similar procedures of preceding paragraph (1), and when combined with an aqueous resin, is obtained an excellent coating composition for top coat use, having markedly improved application characteristics and resulting coating with highly glossy and smooth surface. There are also benefits of widening the selection range of empolyable aqueous resins and acceptable grain size distribution of the resinous particles.

(3) Polymer particles each having double structure comprising hard core of the polymer having relatively higher molecular weight and soft shell of the polymer having relatively lower molecular weight:

Such particles may be advantageously prepared by the so-called two step emulsion polymerization, wherein each different quantity of chain transfer agent is used in the respective step. That is, in the first step, the selected monomer(s) is (are) polymerized in the presence of chain transfer agent in an amount corresponding, for example, to 0.3 to 7% by weight, in terms of dodecylmercaptan equivalent, of the total monomers, thereby forming relatively soft low molecular weight polymer core of the selected ethylenically unsaturated compounds, and in the second step, the selected monomer(s) is (are) polymerized without using or using a lesser amount, for example 0.3 to 5% by weight of the total monomers, of chain transfer agent, thereby forming relatively hard, high molecular weight polymer over a part or whole surface of the said core particles.

Employment of suc polymer particles with an aqueous resin can afford an excellent coating composition having improved application characteristics and resulting excellent top coat coating, and especially in respect of gloss thereof. They can use with a variety of aqueous resins.

(4) Polymer particles each having double structure comprising soft core of the polymer having relatively lower molecular weight and hard shell of the polymer having relatively higher molecular weight:

Such polymer particles may be prepared according to the procedures, with slight modification, of the preceding paragraph (3). Employment of such polymer particles with an aqueous resin can afford an excellent coating composition, especially in respect of application characteristics, pinhole resistance and other film performance, which is useful as a top coat. They can use with a variety of aqueous resins, too.

(5) Polymer particles each having double structure comprising shell portion of the polymer having relatively larger quantity of hydrophilic groups and core portion of the polymer having relatively smaller quantity of hydrophilic groups:

Such polymer particles may be prepared by the so-called 2 step emulsion polymerization. More specifically, in the first step, the polymerizing monomers are selected so that hydrophylic group bearing monomer will constitute 0 to 50% by weight of the total monomers, the hydrophylic group being selected from carboxyl, hydroxyl, amide bonding and the like, and are polymerized by a conventional emulsion polymerization using an emulsifier, polymerization initiator and the like, to give the polymer particles having a mean grain diameter of less than 0.3 to 6μ. In the second step, the polymerizing monomers are selected so that hydrophylic group bearing monomers will constitute 0.5 to 100% by weight of the total monomers, and are, after adding as desired an additional amount of initiator and using the abovesaid polymer particles as seed materials, polymerized to give double structured polymer particles with a mean grain diameter of 0.3 to 6μ. Of course, the preparation of such polymer particles can never be limitted to the above, and any of the appropriate known techniques including NAD method in non-aqueous medium may be satisfactorily used. These particles are very stable even in water and can be used with a variety of aqueous resins. The coating composition thus formulated is characterized by resulting a highly glossy coating. As to the molecular weight (number average molecular weight) of said high polymer, there is no particular limit on it, and however, from the standpoint of stability of the polymer particles, it should preferably be 2000 and more.

The present water insoluble resinous particles may be composed of one or more than two of the abovesaid polymers or copolymers. They may carry with functional groups capable of reacting with each other when heated or with the functional groups possessed by the aqueous resins. Thus, the present coating composition comprising aqueous resin and resinous particles may be of thermoplastic or thermosetting nature as a whole.

In the coating composition of this invention, it is essential that said aqueous resin and water insoluble resinous particles are combined together in the ratio (on solid basis) of 99 to 15% by weight of the former to 1 to 85% by weight of the latter. This is because, if the aqueous resin is too deficient, there is a tendency that dispersion stability of the resinous particles be decreased and the surface smoothness be lost out, and if the amount of water insoluble resinous particles is less than 1% by weight, it is unable to attain the objects of the invention as a top coat. Particularly preferable range is 99 to 40% by weight of the former and 1 to 60% by weight of the latter.

As the reaction medium, water is generally used and however, hydrophylic, polar organic solvents may be coexisted, if desired. Examples of such organic solvents are ethyleneglycol monomethylether, ethyleneglycol monoethylether, ethyleneglycol monobutylether, methanol, ethanol, isopropanol, n-butanol, sec-butanol, t-butanol, dimethylformamide and the like.

The proportion of water medium to resinous component is rather variable for the following reasons. Usually, solid content of 10 to 80% is suitable for spray coating, 5 to 90 % for brush coating, and 1 to 60% for dipping application, and however, the present coating composition is characterized by having an excellent dispersion stability of the resinous particles because of the specific rheological property and hence, the composition can be maintained for a longer period of time, with relatively higher solid content, and diluted to the desired solid content just before the use thereof.

In the present invention, the coating composition comprises as essential components, said aqueous resin, water insoluble resinous particles and aqueous medium, and it is useful as clear paint as it is, to obtain a coating with excellent gloss and surface smoothness. Furthermore, to this resinous composition, pigment, crosslinking agent and other additives may be added according to a general paint manufacturing technique, and mixed well to obtain an aqueous coating composition for a colored top coat having improved application characteristics, durability and capability of forming a coating with excellent gloss and surface smoothness. In this case, any of the coloring matters usually employed for top coat paint may be satisfactorily used. For the introduction of such coloring matter, it is preferred to make a colored paste using a part of aqueous resin and the coloring matter and thus obtained pigment paste is then added with the remaining amount of aqueous resin, resinous particles and other additives. The mixture is then subjected to a mixing and dispersing using a known device like gate mixer, high speed disper and the like. However, it is, of course possible to add from the first all of the abovesaid components to a dispersing device and make a uniform dispersion therefrom.

Crosslinking agents may also be included in the present coating composition, if desired. Examples of such materials are aminoplasts as melamine-formaldehyde resin, methoxy modified or butoxy modified melamine-formaldehyde resin, urea resin, thiourea resin, guanamine resin, acetoguanamine resin and the like; isocyanate compounds as isocyanate, polyisocyanate, blocked polyisocyanate and the like; and phenol resins. If desired, other conventional additives as antisagging agent, antisetting agent, antiflooding agent, antifish eyes agent, surface tension regulator, antioxidant, light stabilizer, UV absorber and the like may be added too. The compounding ratio of these coloring matter, crosslinking agent and other additives and procedures are of conventional and one may follow any conventional techniques known in the related technical field. The present coating composition may be directly or after dilution with water, applied by usual application means as spraying, dipping and brushing and dried or subjected to baking to obtain a top-coat with improved gloss, surface smoothness and durability. Also, the coating composition can exhibit excellent storage stability and application characteristics and hence is very useful as aqueous coating composition for top-coat use.

The invention shall be now more fully explained in the following Examples, in which all parts and % are by weight.

MANUFACTURING EXAMPLE 1

Preparation of Aqueous Resin No. 1

Into a 2 liter glass reaction vessel fitted with stirrer, thermoregulator and decanter, were placed 273 parts of tall oil fatty acid, 197 parts of trimethylolpropane, 78 parts of neopentylglycol, 91 parts of hydrogenated bisphenol A, 204 parts of isophthalic acid, 157 parts of trimellitic anhydride and 20 parts of xylene and the mixture was stirred and heated. While maintaining the reaction temperature at 180° to 210° C. and removing the formed water therefrom, the reaction was continued for 5 hours to obtain an alkyd resin having an acid value of 65, OH value of 100, number average molecular weight of 1500 and oil length of 30. Thereafter, the resin was added with 183 parts of ethyleneglycol monobutyl ether and 96 parts of dimethylethanolamine and then diluted with 832 parts of deionized water to obtain an aqueous varnish having a non-volatile content of 45%.

MANUFACTURING EXAMPLE 2

Preparation of Aqueous Resin No. 2

Into a similar reaction vessel as used in Manufacturing Example 1, were placed 69 parts of trimethylol propane, 297 parts of neopentylglycol, 91 parts of hydrogenated bisphenol A, 201 parts of isophthalic acid, 186 parts of tetrahydrophthalic acid, 155 parts of trimellitic anhydride and 10 parts of xylene and the mixture was stirred and heated. The reaction was continued at 180° to 210° C., while removing the formed water, for 5 hours to obtain a polyester resin having an acid value of 55, OH value of 100 and number average molecular weight of 1500. Next, 183 parts of ethylene glycol monobutyl ether and 82 parts of dimethylethanolamine were added and the mixture was diluted with 851 parts of deionized water to obtain an aqueous varnish of non-volat. content of 45%.

MANUFACTURING EXAMPLE 3

Preparation of Aqueous Resin No. 3

Into a 1 liter reaction vessel fitted with stirrer, thermoregulator and condenser, were placed 76 parts of ethyleneglycol monobutylether, and to this was dropwise added 61 parts of a monomer mixture of 45 parts of styrene, 63 parts of methyl methacrylate, 48 parts of 2-hydroxyethyl methacrylate, 117 parts of n-butylacrylate, 27 parts of methacrylic acid, 3 parts of laurylmercaptan, and 3 parts of azo bisisobutyronitrile, and the temperature was raised to 120° C. under stirring. The remaining 245 parts of the monomer mixture was then dropwise added in 3 hours and the mixture was stirred for additional 1 hour. Thereafter, 28 parts of dimethylethanolamine and 200 parts of deionized water were added to obtain an acrylic resinous varnish having a non-volatile content of 50%, number average molecular weight of the resin being 6000.

MANUFACTURING EXAMPLE 4

Preparation of Aqueous Resin No. 4

Into a 1 liter reacation vessel fitted with stirrer, thermoregulator and condenser, were placed 117 parts of dehydrated castor oil, 173 parts of soybean oil, 17 parts of glycerol, 61 parts of pentaerythritol, 132 parts of phthalic anhydride and 7.5 parts of xylene, and the mixture was, while maintaining the reaction temperature at 180° to 220° C. and removing the formed water therefrom, reacted for 3 hours to obtain an alkyd resin having an oil length of 57%, acid value of 10, number average molecular weight of 1800. This resin was diluted with xylene to obtain an alkyd resin varnish having a non-volatile content of 60%.

Into a similar reaction vessel as stated hereinabove, were placed 200 parts of said alkyd resin varnish and 104 parts of ethyleneglycol monobutylether and the mixture was stirred and heated to 130° C. A monomeric mixture of 60 parts of styrene, 102 parts of methyl methacrylate, 65 parts of 2-hydroxyethyl methacrylate, 31 parts of acrylic acid, 143 parts of n-butylacrylate, 6 parts of di-t-butylperoxide and 8 parts of lauryl mercaptan was dropped in in 3 hours and the reaction was further continued for 1 hour.

Thus obtained acryl modified alkyd resin had an acid value of 50 and number average molecular weight of 7300. The above said reaction mixture was then subjected to 100% neutralization with dimethylethanolamine and diluted with deionized water to obtain an aqueous resinous varnish having a non-volatile content of 50%.

MANUFACTURING EXAMPLE 5

Preparation of Resinous Particles (A)-1

Into a 2 liter glass vessel fitted with stirrer, thermoregulator and condenser, were placed 1100 parts of deionized water and heated to 80° C. To this, were added an aqueous solution of 100 parts of deionized water and 6 parts of ammonium persulfate, and 5 parts of a monomer mixture consisting of 210 parts of methyl methacrylate, 75 parts of 2-ethylhexylacrylate and 15 parts of n-dodecylmercaptan and the mixture was stirred for 5 minutes. Thereafter, 259 parts of the same monomer mixture were dropwise added to the reaction mixture over 1 hour. After completion of said addition, stirring was continued for 15 minutes and then an aqueous solution consisting of 10 parts of deionized water and 1 part of ammonium persulfate was added and the mixture was stirred for 1 hour to obtained a seed emulsion having a solid content of 20%.

Into a similar reaction vessel as used in the preparation of seed emulsion, were placed 300 parts of deionized water and 25 parts of said seed emulsion, and the mixture was heated to 80° C. To the reaction vessel, was added, while stirring, an aqueous solution consisting of 20 parts of deionized water and 0.1 part of ammonium persulfate, and then dropwise a preemulsion consisting of 360 parts of methyl methacrylate, 105 parts of 2-ethylhexyl acrylate, 35 parts of 2-hydroxy ethyl acrylate, 5 parts of n-dodecylmercaptan, 200 parts of deionized water, 0.4 part of sodium dodecylbenzene sulfonate and 0.8 part of ammonium persulfate over 2 hours. Thereafter, stirring was continued for 30 minutes, an aqueous solution of 0.2 part of ammonium persulfate and 20 parts of deionized water were added and stirring was further continued for 1 hour. Thus obtained emulsion had a solid content of 48.0%, average grain diameter of the resinous particles (measured by electronmicroscope) being $0.7\mu$, maximum diameter being $1.4\mu$ and number average molecular weight being 9800.

MANUFACTURING EXAMPLE 6

Preparation of Resinous Particles (A)-2 in a similar reaction vessel as used in the preceding Manuf. Example, were weighed 600 parts of deionized water and the temperature was raised to 80° C. To this, were added an aqueous solution of 30 parts of deionized water and 8 parts of ammonium persulfate, and 30 parts of a monomer mixture of 432 parts of methyl methacrylate, 126 parts of 2-ethylhexylacrylate, 42 parts of 2-hydroxyethyl acrylate and 30 parts of t-dodecylmercaptan, and the mixture was stirred for 5 minutes. Next, the remaining 600 parts of said monomer mixture were dropwise added over 3.5 hours and stirring was continued for 30 minutes. At this stage, an aqueous solution of 24 hours of deionized water and 0.24 part of ammonium persulfate was added and the reaction mixture was stirred for additional 1 hour. Thus obtained emulsion had a non-volatile content of 49.0%, average grain diameter of the resionous particles being $0.9\mu$, the maxiumum diameter being $0.95\mu$ and number average molecular weight of the resin being 4200.

MANUFACTURING EXAMPLES 7~9

Preparation of Resinous Particles (A)-3~5

Using the same procedures as stated in Manufacturing Example 1 but substituting the following emulsions for the preemulsion of said Manufacturing Example, various resinous particles (A)-3~5 were prepared.

The characteristics of these resinous particles were also shown in the following Table 1.

TABLE 1

| resin. partic. | composition of pre-emulsion | | | | | | | | | | character. of particles | | | |
|---|---|---|---|---|---|---|---|---|---|---|---|---|---|---|
| | MMA | 2-EHA | 2-HEA | ST | MAA | EGDM | DM | DBS | APS | DIW | NV % | D μ | Dmax μ | Mn |
| 3 | 260 | 105 | 35 | 100 | — | — | 10 | 0.4 | 0.8 | 200 | 48 | 0.5 | 0.9 | 7600 |
| 4 | 340 | 95 | 35 | — | 30 | — | — | 0.4 | 0.8 | 200 | 48 | 1.8 | 3.2 | 20000 |
| 5 | 255 | 105 | 35 | 100 | — | 5 | — | 0.4 | 0.8 | 200 | 48 | 1.2 | 3.0 | — | wherein:
MMA: methyl methacrylate
2-EHA: 2-ethylhexyl acrylate
2-HEA: 2-hydroxyethyl acrylate
ST: styrene
MAA: methacrylic acid
EGDM: ethyleneglycol dimethacrylate
DM: n-dodecyl mercaptan
DBS: sodium dodecylbenzene sulfonate
APS: ammonium persulfate
DIW: deionized water
NV: non-volatile content of emulsion
D: average grain diam. of resinous particles
Dmax: maximum diameter of resinous particles

MANUFACTURING EXAMPLE 10

Preparation of Resinous Particles (A)-6

Into a similar reaction vessel as used in manufacturing Example 5, were weighed 215 parts of deionized water and 25 parts of seed emulsion of Manufacturing Example 5, and the mixture was heated to 80° C. To this reaction vessel, was added, while keep stirring, an aqueous solution of 20 parts of deionized water and 0.1 part of ammonium persulfate, and then dropwise a pre-emulsion consisting of 295 parts of methyl methacrylate, 100 parts of 2-ethylhexyl acrylate, 34 parts of 2-hydroxyethyl acrylate, 200 parts of deionized water, 0.4 part of sodium dodecylbenzene sulfonate and 0.9 part of ammonium persulfate over 2 hours. At the stage when elapsed 1.5 hour from the commencement of said dropping of the pre-emulsion, was started simultaneous dropping of the second pre-emulsion consisting of 45 parts of methyl methacrylate, 15 parts of 2-ethylhexylacrylate, 5 parts of 2-hydroxyethyl acrylate, 30 parts of deionized water, 0.06 part of sodium dodecylbenzene sulfonate, 0.14 part of ammonium persulfate and 4 parts of n-dodecylmercaptan. The said simultaneous dropping was completed in 30 minutes and then the mixture was stirred for additional 30 minutes. Next, an aqueous solution of 0.2 part of ammonium persulfate in 20 parts of deionized water was added and stirring was continued for 1 hour to complete the reaction. Thus obtained emulsion showed non-volatile content of 48.5%, average grain side of the particles contained being 1.6μ and the maximum grain diameter being 2.5μ.

MANUFACTURING EXAMPLE 11

Preparation of Resinous Particles (A)-7

Into a similar reaction vessel as used in Manufacturing Example 5, were weighed 250 parts of deionized water and 25 parts of seed emulsion of Manufacturing Example 5, and the mixture was heated to 80° C. While keep stirring, an aqueous solution of 0.1 part of ammonium persulfate in 17 parts of deionized water was added and then a pre-emulsion consisting of 195 parts of methyl methacrylate, 100 parts of 2-ethylhexyl acrylate, 200 parts of deionized water, 0.4 part of sodium dodecylbenzene sulfonate and 0.9 part of ammonium persulfate was dropped in over 2 hours. After completion of said addition, the mixture was stirred for 10 10 minutes. At this stage (after formation of core portion), was added a monomer mixture of 135 parts of methyl methacrylate, 65 parts of 2-ehtylhexyl acrylate and 6 parts of n-dodecylmercaptan in 15 minutes and stirring was continued for 30 minutes. Then, an aqueous solution of 0.2 part of ammonium persulfate in 20 parts of deionized water was added and the mixture was stirred for additional 1 hour to complete the reaction. Thus obtained emulsion showed a non-volatile content of 48.0%, the mean grain diameter of the particles being 28.82 and the maximum diameter being 4.0μ.

MANUFACTURING EXAMPLE 12

Preparation of Resinous Particles (A)-8

Into a similar reaction vessel as used in Manufacturing Example 5, were placed 300 parts of deionized water and 25 parts of seed emulsion and the mixture was heated to 80° C. To this, was added an aqueous solution of 0.1 part of ammonium persulfate in 20 parts of deionized water and then a pre-emultion of 295 parts of methyl methacrylate, 100 parts of 2-ethylhexyl acrylate, 34 parts of 2-hydroxyethyl acrylate, 24 parts of n-dodecylmercaptan, 200 parts of deionized water, 0.4 part of sodium dodecylbenzene sulfonate and 0.9 part of ammonium persulfate was dropwise added in 2 hours. After elapsing 1.5 hours from the commencement of dropping of said pre-emulsion, simultaneous addition of the second monomer mixture of 41 parts of methyl methacrylate and 25 parts of acrylic acid was started and said addition was overed in 30 minutes. After completion of said addition, the mixture was stirred for additional 1 hour to complete the reaction. Thus obtained emulsion had a non-volatile content of 50.0%, an average grain size of 1.6μ and maximum grain diameter of 2.5μ.

MANUFACTURING EXAMPLE 13

Preparation of Resinous Particles (A)-9

Inato a similar reaction vessel as used in Manufacturing Example 5, were placed 300 parts of deionized water and 25 parts of seed emulsion of Manufacturing Example 5, and the mixture was heated to 80° C. To this, was added an aqueous solution of 0.1 part of ammonium persulfate in 20 parts of deionized water, and then a pre-emulsion consisting of 295 parts of methyl methacrylate, 100 parts of 2-ethylhexyl acrylate, 34 parts of 2-hydroxyethyl acrylate, 24 parts of n-dodecylmercaptan, 200 parts of deionized water, 0.4 part of sodium dodecylbenznenesulfonate and 0.9 part of ammonium persulfate was dropwise added in 2 hours. After completion of said addition, the mixture was stirred for 10 minutes (formation of core portion) and then a monomer mixture of 31 parts of methyl methacrylate and 35 parts of 2-hydroxy ethyl acrylate was dropwise added in 5 minutes. Thereafter, the mixture was stirred for 30 minutes, added with an aqueous solution of 0.2 part of ammonium persulfate in 20 parts of deionized water, and stirred for 1 hour to complete the reaction. Thus obtained emulsion had a non-volatile content of 48.0%, an average grain diameter of 1.6μ and the maximum grain diameter of 2.5μ.

REFERENCE EXAMPLE 1

Into a 2 liter flask fitted with stirrer, condenser and thermoregulator, were added 73.5 parts of sodium salt of taurine, 100 parts of ethyleneglycol and 200 parts of ethyleneglycol monoethylether, and the mixture was heated under stirring to 120° C. After having obtained a uniform solution, a mixed solution of 470 parts of Epicote 1001 (bisphenol A diglycidyl ether type epoxy resin, epoxy equivalent 470, manufactured by Shell Chem. Co.) and 400 parts of ethyleneglycol monoethyl ether was dropwise added in 2 hours.

Thereafter, the mixture was stirred and heated at the same temperature for 20 hours to complete the reaction. The reaction solution was then acidified with hydrochloric acid and the precipitated product was separated, purified by repeating precipitation with ethyleneglycol monoethyl ether and water, and dried under reduced pressure to obtain 205 parts of modified epoxy resin. The acid value (by KOH titration) of the resin was 48.6 and sulfur content (by X ray fluorimetry) was 35.

REFERENCE EXAMPLE 1

Into a 2 liter flask fitted with stirrer, nitrogen inlet, thermoregulator, condenser and decanter, were placed 134 parts of bishydroxyethyl taurine, 130 parts of neopentylglycol, 236 parts of azelaic acid, 186 parts of phthalic anhydride and 27 parts of xylene and the mixture was heated and refluxed, while removing the formed water azeotropically with xylene. The temperature was raised to 190° C. in about 2 hours from the commencement of said refluxing, and stirring and dehydration were continued until carboxylic acid based acid value of 145. Thereafter, the reaction mixture was allowed to cool to 140° C. and, while maintaining the said temperature, added dropwise with 314 parts of Cardura E 10 (versatic acid glycidyl ester, manufactured by Shell Chem. Co.) in 30 minutes, and stirred for 2 hours to complete the reaction. Thus obtained polyester resin had an acid value of 59, hydroxyl number of 90 and Mn 1054.

MANUFACTURING EXAMPLE 14

Preparation of Resinous Particles (B)-1

Into a 1 liter flask fitted with stirrer, condenser and thermoregulator, were placed 35.5 parts of sodium dodecyl sulfate and 2 parts of sodium persulfate, and the mixture was heated under stirring to 80° C. Next, an aqueous solution of 0.61 part of sodium hydrogen sulfite in 50 parts of deionized water was dropwise added in 1 hour and the mixture was stirred for 30 minutes to complete the reaction.

Thus obtained emulsion had a non-volatile content of 15%, the grain size of the particles contained being 0.035μ.

MANUFACTURING EXAMPLE 15

Preparation of Resinous Particles (B)-2

Into a 1 liter reaction vessel fitted with stirrer, condenser and thermoregulator, were placed 306 parts of deionized water, 45 parts of modified epoxy resin obtained in Reference Example 1 and 6 parts of dimethylethanolamine, and the mixture was, while stirring, heated to 80° C. to effect through melting of the same. Thereafter, while keep stirring and maintaining the temeprature at 80° C., a mixed solution of 4.8 parts of azobiscyanovaleric acid, 4.56 parts of dimethylethanolamine and 48 parts of deionized water was added and then a mixed solution of 67 parts of styrene, 67 parts of methyl methacrylate, 85 parts of n-butyl acrylate, 30 parts of 2-hydroxyethyl acrylate and 6 parts of ethylene glycol dimethacrylate was dropwise added in 150 minutes. After completion of said addition, was added at the same temperature, a mixture of 1.2 parts of azobiscyanovaleric acid, 1.14 parts of dimethylethanolamine and 12 parts of deionized water and the mixture was stirred for additional 60 minutes to obtain an emulsion having a non-volatile content of 45%, pH 7.2, viscosity (25° C.) 72 cps and average grain diameter of 0.040μ.

MANUFACTURING EXAMPLE 16

Preparation of Resinous Particles (B)-3

Into a 1 liter reaction vessel fitted with stirrer, condenser and thermoregulator, were placed 271 parts of deionized water, 80 parts of modified epoxy resin obtained in Reference Example 1 and 10.7 parts of dimethylethanolamine, and the mixture was, while stirring, heated to 80° C., thereby effecting thorough melting of the same. While maintaining the temperature at 80° C. under stirring, was added a mixed solution of 3.2 parts of azobiscyano vlaeirc acid, 3 parts of dimethylethanolamine and 48 parts of deionized water and then dropwise a mixed solution of 94 parts of styrene, 12 parts of 2-hydroxyethylacrylate and 94 parts of ethyleneglycol dimethacrylate in 150 minutes. After completion of said addition, the mixture was added at the same temperature with a mixed solution of 0.8 part of azobiscyanovaleric acid 0.76 part of dimethylethanolamine and 12 parts of deionized water and stirred for 60 minutes to obtain an emulsion having a non-volatile content 45%, pH 7.6, viscosity (25° C.) 133 cps, average grain size of the particles 0.045μ.

MANUFACTURING EXAMPLE 17

Preparation of Resinous Particles (B)-4

Into a 1 liter reaction vessel fitted with stirrer, condenser and thermoregulator, were placed 306 parts of deionized water, 30 parts of polyester resin obtained in reference Example 2 and 3 parts of dimethylethanolamine, and the mixture was heated, under stirring, to 80° C., thereby effecting thorough melting of the same. To this, was added a solution of 4.5 parts of azobiscyanovaleric acid in 45 parts of deionized water and 4.3 parts of dimethylethanolamine, and then dropwise in 60 minutes a mixed solution of 63 parts of methyl methacrylate, 84 parts of n-butylacrylate, 63 parts of styrene, 30 parts of 2-hydroxyethylacrylate and 30 parts of ethyleneglycol dimethacrylate. Thereafter, a mixture of 1.5 parts of azobiscyanovaleric acid, 15 parts of deionized water and 1.4 parts of dimethylethanolamine was added and the mixture was stirred at 80° C. for 60 minutes to obtained an emulsion having a non-volatile content 45%, pH 7.4, viscosity (25° C.) 110 cps and average grain size of resinous particles 0.075μ. For comparison's sake, the following resinous particles were prepared.

Preparation of Comparative Resinous Particles-1

Into a similar reaction vessel as used in Manufacturing Example 5, were placed 700 parts of deionized water and 10 parts of sodium dodecylbenzene sulfonate and the mixture was heated to 80° C. To this, was added, under stirring, 4.5 parts of ammonium persulfate, and then a monomer mixture of 360 parts of methyl methacrylate, 105 parts of 2-ethylhexyl acrylate, 35 parts of 2-hydroxyethylacrylate and 10 parts of n-dodecylmercaptan was dropwise added in 2 hours. After elapsing 15 minutes from the completion of said addition, the mixture was added with an aqueous solution of 0.5 part of ammonium persulfate in 50 parts of deionized water and stirred for additional 1 hour to complete the reaction. Thus obtained emulsion had a non-volatile content of 40% and mean diameter of resinous particles contained was 0.19μ. The number average molecular weight of the resin was 8200.

Preparation of Comparative Resinous Particles-2

Into a similar reaction vessel as used in Manufacturing Example 5, were placed 900 parts of deionized water, 1.5 parts of Metholose 60SH-50(methyl cellulose, manufactured by Shinetsu Kagaku), 216 parts of methyl methacrylate, 63 parts of 2-ethylhexylacrylate, 21 parts of 2-hydroxyethyl acrylate, 6 parts of n-dodecylmercaptan and 6 parts of azobisisobutyronitrile, and the mixture was stirred at 250 rpm at 65° C. for 7 hours to complete the reaction.

Thus obtained suspension was filtered through 200 mesh sieve to obtain pearl particles having diameters of 20 to 600μ. The particles were ball-milled for 24 hours to obtain the resinous particles having an average grain diameter of 18μ and the maximum diameter of 45μ, the molecular weight being 7600.

EXAMPLES 1~10

(Preparation of Pigment Pastes)

Into a 1.5 liter closed type stainless steel vessel, were placed 178 parts of aqueous resin -1, 320 parts of Taipake R-820 (rutile type titanium oxide, manufactured by Ishihara Sangyo) and 60 parts of deionized water. To this, were added 500 cc of glass beads and the content was premixed with a stirrer and then mixed well by means of paint conditioner for 2 hours to obtain a pigment paste No. 1.

Repeating the same procedures but substituting aqueous resins -2, -3 (in this case, 160 parts of the aqueous resin was used together with 178 parts of deionized water), and -4 for aqueous resin-1, pigment pastes Nos. 2, 3 and 4 were prepared, respectively.

(Preparation of Coating Compositions)

Into a stainless steel vessel, were placed the materials shown in the following Table 2 and stirred and mixed well by means of stirrer to obtain the respective coating compositions.

TABLE 2

| Exam. | pigment paste 1 | 2 | 3 | 4 | aqueous resin 1 | 2 | 3 | 4 | resinous particles (A) 1 | 2 | 3 | 4 | 5 | 6 | 7 | 8 | 9 | res. part. (B) 1 | 2 | 3 | 4 | MF |
|---|---|---|---|---|---|---|---|---|---|---|---|---|---|---|---|---|---|---|---|---|---|---|
| 1 | 140 | | | | 31 | | | | 54 | | | | | | | | | 40 | | | | 14 |
| 2 | 140 | | | | 84 | | | | | 12 | | | | | | | | | 5 | | | 14 |
| 3 | | 140 | | | | 56 | | | | | 46 | | | | | | | | 5 | | | 11 |
| 4 | | | 140 | | | | 18 | | | | | 42 | | | | | | | | 44 | | 12 |
| 5 | | | | 140 | | | 18 | | | | | | 67 | | | | | | | 18 | | 12 |
| 6 | 140 | | | | 31 | | | | | | | | | 39 | | | | | | | 29 | 14 |
| 7 | 140 | | | | | 18 | | | | | | | | | 75 | | | | 9 | | | 12 |
| 8 | | 140 | | | | | 31 | | | | | | | | | 58 | | | 7 | | | 14 |
| 9 | | | 140 | | | 56 | | | | | | | | | | | 35 | 47 | | | | 11 |
| 10 | | | | 140 | | | 56 | | 45 | | | | | | | | | | | | 5 | 11 | wherein MF stands for hexamethoxy methylol melamine (solid 100%)

COMPARATIVE EXAMPLES 1~13

Using the same procedures as stated in Examples 1~10 but with the materials shown in the following Table 3, comparative coating compositions were prepared.

TABLE 3

| comp. exam. | pig. paste 1 | 2 | aqueous resin 1 | 2 | 3 | resinous particles res. 1 | comp. 1 | comp. 2 | MF (parts) |
|---|---|---|---|---|---|---|---|---|---|
| 1 | 14 | | 8 | | | 112 | | | 1 |
| 2 | | 140 | | 76 | | | 54 | | 23 |
| 3 | 140 | | | 89 | | | | 25 | 15 |

The respective coating composition was diluted with deionized water to Ford cup #4 viscosity of 30 seconds.

Following the normal procedures, the composition was applied onto steel plates by spraying and after setting for 5 min., baked at 150° C. for 15 minutes to obtain crosslinked coating. The maximum film thickness showing no pinholes, the maximum film thickness showing no sagging and gloss for the respective coating are shown in Table 4.

TABLE 4

| | pinhole | sagging | gloss |
|---|---|---|---|
| Example | | | |
| 1 | ◉ | ◉ | ◉ |
| 2 | ◉ | ◉ | ◉ |
| 3 | ◉ | ◉ | ◉ |
| 4 | ◉ | ◉ | ◉ |
| 5 | ◉ | ◉ | ◉ |
| 6 | ◉ | ◉ | ◉ |
| 7 | ◉ | ◉ | ◉ |
| 8 | ◉ | ◉ | ◉ |
| 9 | ◉ | ◉ | ◉ |
| 10 | ◉ | ◉ | ◉ |
| 11 | ◉ | ◉ | ◉ |
| Comp. Ex. | | | |
| 1 | ○ | ○ | ○ |

TABLE 4-continued

| | | | |
|---|---|---|---|
| 2 | X | Δ | O |
| 3 | X | Δ | X |
| maximum film thick. showing no pinhole | maximum film thick. showing no sagging | gloss 60° gloss value | |
| more than 50μ | more than 50μ | more than 90 | |
| more than 40μ | more than 40μ | more than 85 | |
| Δ 30~40μ | Δ 30~40μ | Δ 80~85 | |
| X less than 30μ | X less than 30μ | X less than 80 | |

What is claimed is:

1. An aqueous coating composition comprising, as a resinous vehicle, at least one water soluble resin selected from the group consisting of a polyester resin, an alkyd resin, an acrylic resin, an acryl modified-polyester resin and an acryl modified-alkyd resin, and at least one water insoluble resin in particulate form obtained by the polymerization or copolymerization of $\alpha, \beta$-ethylenically unsaturated monomer(s), which is characterized in that said water insoluble particulate resin is composed of mixture of (A) a group resinous particles having a mean grain diameter of 0.3~6μ and (B) a group of resinous particles having a mean grain diameter of 0.01~0.1μ, in a weight ratio of (A)/(B)=99.9/0.1~40/60, and in that the solid weight ratio of said water soluble resin to the water insoluble resin particles is 99/1~15/85.

2. The composition according to claim 1 wherein the mean grain diameter of (A) group resinous particles is 0.4~5μ.

3. The composition according to claim 1, wherein the weight ratio of (A)/(B)=99/1~50/50.

4. The composition according to claim 1, wherein the solid weight ratio of the water soluble resin to the water insoluble resin is 99/1~40/60.

5. The composition according to claim 1 wherein the water insoluble resin particles (A) composed of a double structure having shell and core portions each having different properties.

6. The composition according to claim 5 wherein the resinous particles (A) are composed of a double structure having a relatively hard shell portion and a relatively soft core portion.

7. The composition according to claim 5 wherein the resinous particles (A) are composed of a double structure having a relatively soft shell portion and a relatively hard core portion.

8. The composition according to claim 5 wherein the resinous particles (A) are composed of a double structure having a shell portion with a relatively larger quantity of hydrophilic groups and a core portion with a relatively lesser quantity of hydrophilic groups.

* * * * *